United States Patent
Chang et al.

(10) Patent No.: US 11,947,092 B2
(45) Date of Patent: Apr. 2, 2024

(54) LENS ASSEMBLY

(71) Applicants: Sintai Optical (Shenzhen) Co., Ltd., ShenZhen (CN); Asia Optical Co., Inc., Taichung (TW)

(72) Inventors: Hsi-Ling Chang, Taichung (TW); Guo-Yang Wu, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 224 days.

(21) Appl. No.: 17/567,261

(22) Filed: Jan. 3, 2022

(65) Prior Publication Data
US 2022/0244509 A1  Aug. 4, 2022

(30) Foreign Application Priority Data
Feb. 2, 2021  (CN) .......................... 202110140028.5

(51) Int. Cl.
| | |
|---|---|
| G02B 15/14 | (2006.01) |
| G02B 7/10 | (2021.01) |
| G02B 13/00 | (2006.01) |
| G02B 17/08 | (2006.01) |
| G02B 27/64 | (2006.01) |
| G03B 17/17 | (2021.01) |

(52) U.S. Cl.
CPC ......... G02B 15/1465 (2019.08); G02B 7/102 (2013.01); G02B 13/0045 (2013.01); G02B 13/0065 (2013.01); G02B 17/0896 (2013.01); G02B 27/646 (2013.01); G03B 17/17 (2013.01)

(58) Field of Classification Search
CPC ............... G02B 15/1465; G02B 7/102; G02B 13/0045; G02B 13/0065; G02B 13/007; G02B 17/0896; G02B 27/646; G02B 13/009; G02B 15/144511; G03B 17/17
USPC .......................................... 359/761, 682, 752
See application file for complete search history.

(56) References Cited

U.S. PATENT DOCUMENTS

| | | | |
|---|---|---|---|
| 7,312,931 B2 | 12/2007 | Sano et al. | |
| 8,405,914 B2 | 3/2013 | Yamashita | |
| 2007/0109663 A1 | 5/2007 | Sano et al. | |

(Continued)

FOREIGN PATENT DOCUMENTS

| | | |
|---|---|---|
| CN | 1940630 A | 4/2007 |
| CN | 201017095 Y | 2/2008 |
| CN | 103278913 A | 9/2013 |

(Continued)

*Primary Examiner* — Cara E Rakowski
(74) *Attorney, Agent, or Firm* — McClure, Qualey & Rodack, LLP

(57) ABSTRACT

A lens assembly includes a first lens group, a second lens group, a third lens group, a fourth lens group, a fifth lens group, a sixth lens group, and a first reflective element. The first and third lens groups are with negative refractive power. The second and fourth lens groups are with positive refractive power. The fifth and sixth lens groups are with refractive power. The first, second, third, fourth, fifth, and sixth lens groups are arranged in order from a first side to a second side along an axis. The first reflective element includes a first reflective surface. A light from the first side sequentially passes through the first, second, third, fourth, fifth, and sixth lens groups to the second side. The first reflective element is disposed between the first lens group and the sixth lens group.

20 Claims, 10 Drawing Sheets

(56) References Cited

U.S. PATENT DOCUMENTS

2007/0171543 A1* 7/2007 Souma ............... G02B 15/1465
359/689
2008/0252994 A1* 10/2008 Matsui ................ G02B 27/646
359/695

FOREIGN PATENT DOCUMENTS

| CN | 104007543 A | 8/2014 | |
|----|---|---|---|
| CN | 105044892 A | 11/2015 | |
| TW | 201430378 A | 8/2014 | |
| TW | 201433821 A | 9/2014 | |
| WO | 2016194775 A1 | 3/2018 | |
| WO | WO-2019167925 A1 * | 9/2019 | ......... G02B 13/0065 |

* cited by examiner

LENS ASSEMBLY

BACKGROUND OF THE INVENTION

Field of the Invention

The invention relates to a lens assembly.

Description of the Related Art

The total length of the optical zoom lens is significantly longer than the total length of the fixed focus lens, and as the magnification becomes larger, the total length of the lens assembly becomes longer. Today's thin and light smartphone cannot be equipped with traditional optical zoom lens. Therefore, a lens assembly needs a new structure having miniaturization, high resolution, and optical zoom at the same time, in order to meet the requirements of smart phone for optical zoom function.

BRIEF SUMMARY OF THE INVENTION

The invention provides a lens assembly to solve the above problems. The lens assembly of the invention is provided with characteristics of a decreased total lens length, a decreased lens thickness, an increased resolution, an optical zoom function, and still has a good optical performance.

The lens assembly in accordance with an exemplary embodiment of the invention includes a first lens group, a second lens group, a third lens group, a fourth lens group, a fifth lens group, a sixth lens group, and a first reflective element. The first lens group is with negative refractive power. The second lens group is with positive refractive power. The third lens group is with negative refractive power. The fourth lens group is with positive refractive power. The fifth lens group is with refractive power. The sixth lens group is with refractive power. The first lens group, the second lens group, the third lens group, the fourth lens group, the fifth lens group, and the sixth lens group are arranged in order from a first side to a second side along an axis. The first reflective element includes a first reflective surface. A light from the first side sequentially passes through the first lens group, the second lens group, the third lens group, the fourth lens group, the fifth lens group, and the sixth lens group to the second side. The first reflective element is disposed between the first lens group and the sixth lens group.

In another exemplary embodiment, the first reflective element further includes a first incident surface facing the first side along the axis and a first exit surface facing the second side along the axis.

In yet another exemplary embodiment, the fifth lens group is with negative refractive power and the sixth lens group is with positive refractive power.

In another exemplary embodiment, the first lens group includes a 1-1 lens which is with negative refractive power, the second lens group includes a 2-2 lens which is with positive refractive power, and the third lens group includes a 3-1 lens which is with negative refractive power.

In yet another exemplary embodiment, the fourth lens group includes a 4-1 lens which is with positive refractive power, the fifth lens group includes a 5-1 lens which is with negative refractive power, and the sixth lens group includes a 6-1 lens which is with positive refractive power.

In another exemplary embodiment, the 1-1 lens which is a biconcave lens and includes a concave surface facing the first side along the axis and another concave surface facing the second side along the axis, the 2-2 lens which is a biconvex lens and includes a convex surface facing the first side along the axis and another convex surface facing the second side along the axis, and the 3-1 lens which is a meniscus lens and includes a concave surface facing the first side along the axis and a convex surface facing the second side along the axis.

In yet another exemplary embodiment, the 4-1 lens which is a meniscus lens and includes a concave surface facing the first side along the axis and a convex surface facing the second side along the axis, the 5-1 lens which is a meniscus lens and includes a convex surface facing the first side along the axis and a concave surface facing the second side along the axis, and the 6-1 lens includes a convex surface facing the first side along the axis.

In another exemplary embodiment, the first lens group further includes a 1-2 lens disposed between the 1-1 lens and the second lens group, wherein the 1-2 lens is with positive refractive power, and the second lens group further includes a 2-1 lens disposed between the first lens group and the 2-2 lens, wherein the 2-1 lens is with negative refractive power.

In yet another exemplary embodiment, the fifth lens group further includes a 5-2 lens disposed between the 5-1 lens and the sixth lens group, wherein the 5-2 lens is with negative refractive power, and the sixth lens group further includes a 6-2 lens disposed between the 6-1 lens and the second side, wherein the 6-2 lens is with negative refractive power.

In another exemplary embodiment, the 1-2 lens which is a meniscus lens and includes a convex surface facing the first side along the axis and a concave surface facing the second side along the axis, and the 2-1 lens which is a meniscus lens and includes a convex surface facing the first side along the axis and a concave surface facing the second side along the axis.

In yet another exemplary embodiment, the 5-2 lens which is a meniscus lens and includes a convex surface facing the first side along the axis and a concave surface facing the second side along the axis, and the 6-2 lens includes a concave surface facing the second side along the axis.

In another exemplary embodiment, the 6-1 lens and the 6-2 lens are cemented.

In yet another exemplary embodiment, the second lens group includes a variable stop.

In another exemplary embodiment, the second lens group and the third lens group can move along the axis to change a magnification of the lens assembly.

In yet another exemplary embodiment, the fifth lens group can move along the axis and thereby perform auto focus.

In another exemplary embodiment, the sixth lens group can move along the direction perpendicular to the axis to achieve optical image stabilization.

In yet another exemplary embodiment, the lens assembly further comprises a second reflective element disposed between the first side and the first lens group, wherein the second reflective element includes a second reflective surface.

In another exemplary embodiment, the second lens group includes a variable stop, and the lens assembly satisfies at least one of the following conditions: $-12$ mm$<$A$-$B$<16$ mm; $0.2<$A/B$<10$; $0.5<$C/A$<3$; $2<$TTL/A$<11$; wherein A is an interval from a second side surface of the lens closest to the second side in the first lens group to the variable stop along the axis, B is an interval from the variable stop to a first side surface of the lens closest to the first side in the fourth lens group along the axis, C is an interval from a first side surface of the lens closest to the first side in the fifth lens group to an image plane along the axis, and TTL is an interval from a first side surface of the lens closest to the first side along the axis in the first lens group to an image plane along the axis.

In yet another exemplary embodiment, the second lens group includes a variable stop, and the lens assembly satisfies at least one of the following conditions: 10 mm<A+L1D<26 mm; 12 mm<L1D+StopD<16 mm; 0.8<f/L1D<4.2; wherein A is an interval from a second side surface of the lens closest to the second side in the first lens group to the variable stop along the axis, L1D is an effective optical diameter of the lens closest to the first side in the first lens group along the axis, StopD is a diameter of the variable stop, and f is an effective focal length of the lens assembly.

In another exemplary embodiment, the lens assembly satisfies at least one of the following conditions: 11 mm<C<12 mm; 0.1 mm<D<0.6 mm; wherein C is an interval from a first side surface of the lens closest to the first side in the fifth lens group to an image plane along the axis and D is an offset of the sixth lens group moving along the direction perpendicular to the axis.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a lens assembly including a first lens group, a second lens group, a third lens group, a fourth lens group, a fifth lens group, a sixth lens group, and a first reflective element. The first lens group which is with negative refractive power. The second lens group which is with positive refractive power. The third lens group which is with negative power. The fourth lens group which is with positive power. The fifth lens group which is with refractive power. The sixth lens group which is with refractive power. The first reflective element includes a first reflective surface. The first lens group, the second lens group, the third lens group, the fourth lens group, the fifth lens group, and the sixth lens group are arranged in order from a first side to a second side along an axis. A light from the first side sequentially passes through the first lens group, the second lens group, the third lens group, the fourth lens group, the fifth lens group, and the sixth lens group to the second side. The first reflective element is disposed between the first lens group and the sixth lens group.

Figure 1:
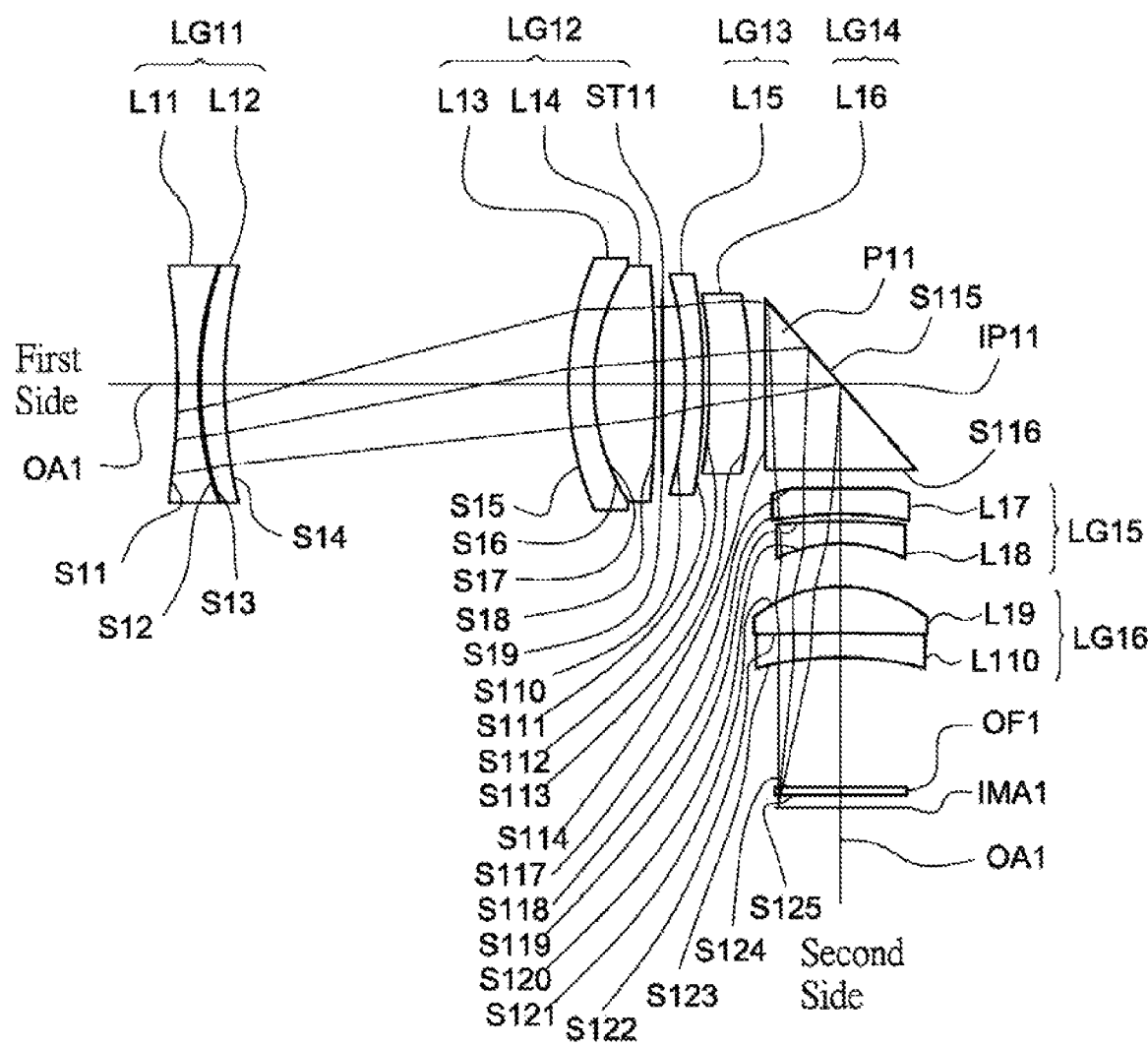
FIG. 1 is a lens layout and optical path diagram of a lens assembly at 3 times magnification in accordance with a first embodiment of the invention.
Figure 2A:
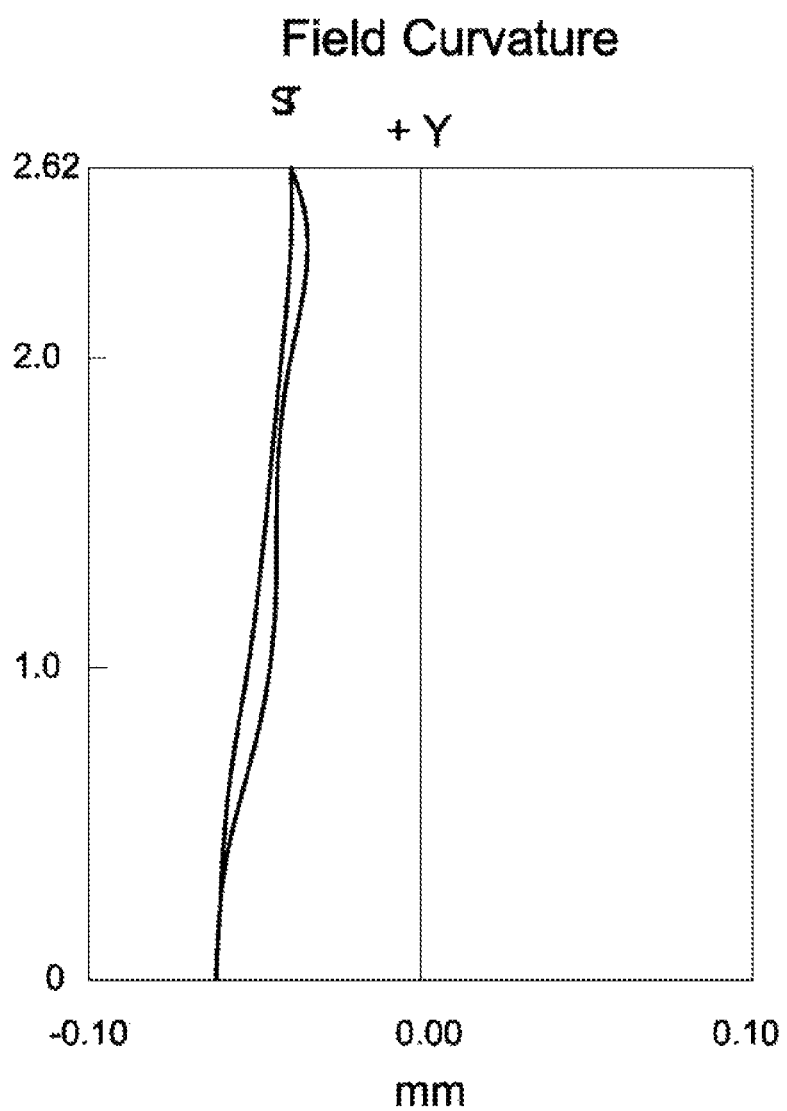
FIG. 2A, FIG. 2B, and FIG. 2C depict a field curvature diagram, a distortion diagram, and a modulation transfer function diagram of the lens assembly at 3 times magnification in accordance with the first embodiment of the invention, respectively.
Figure 2B:
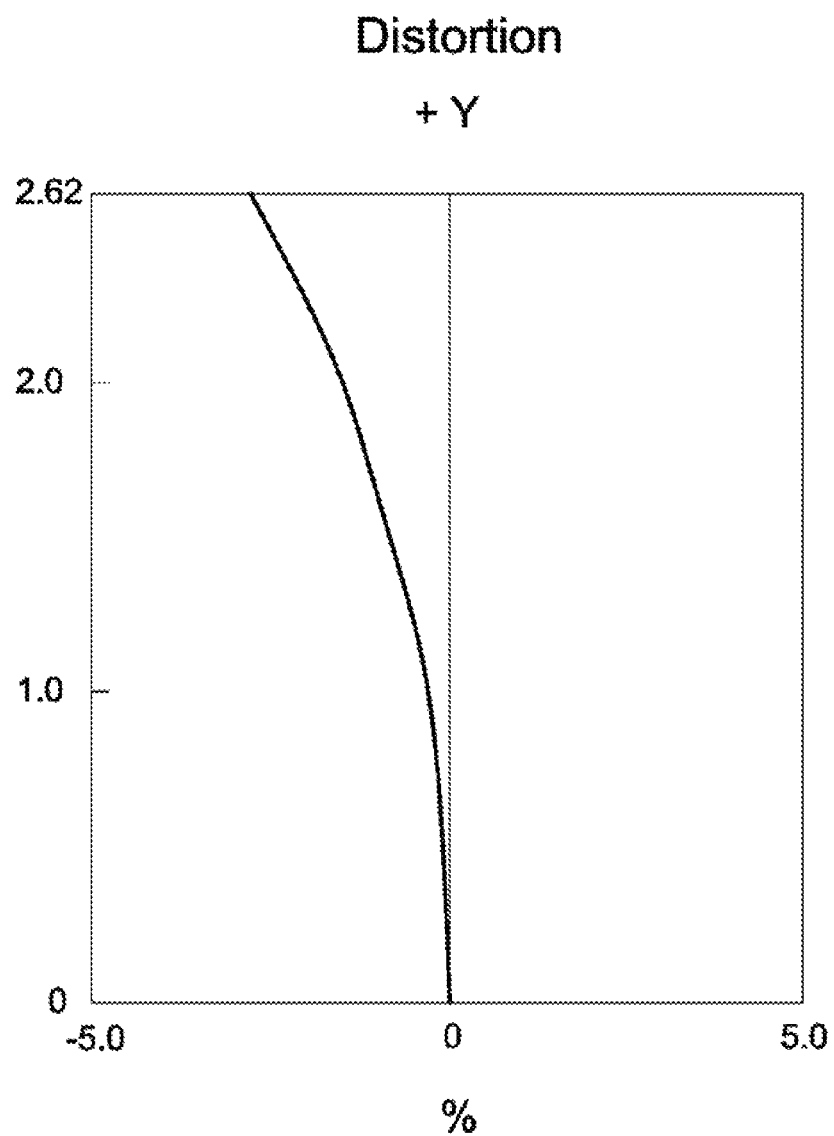
Figure 2C:
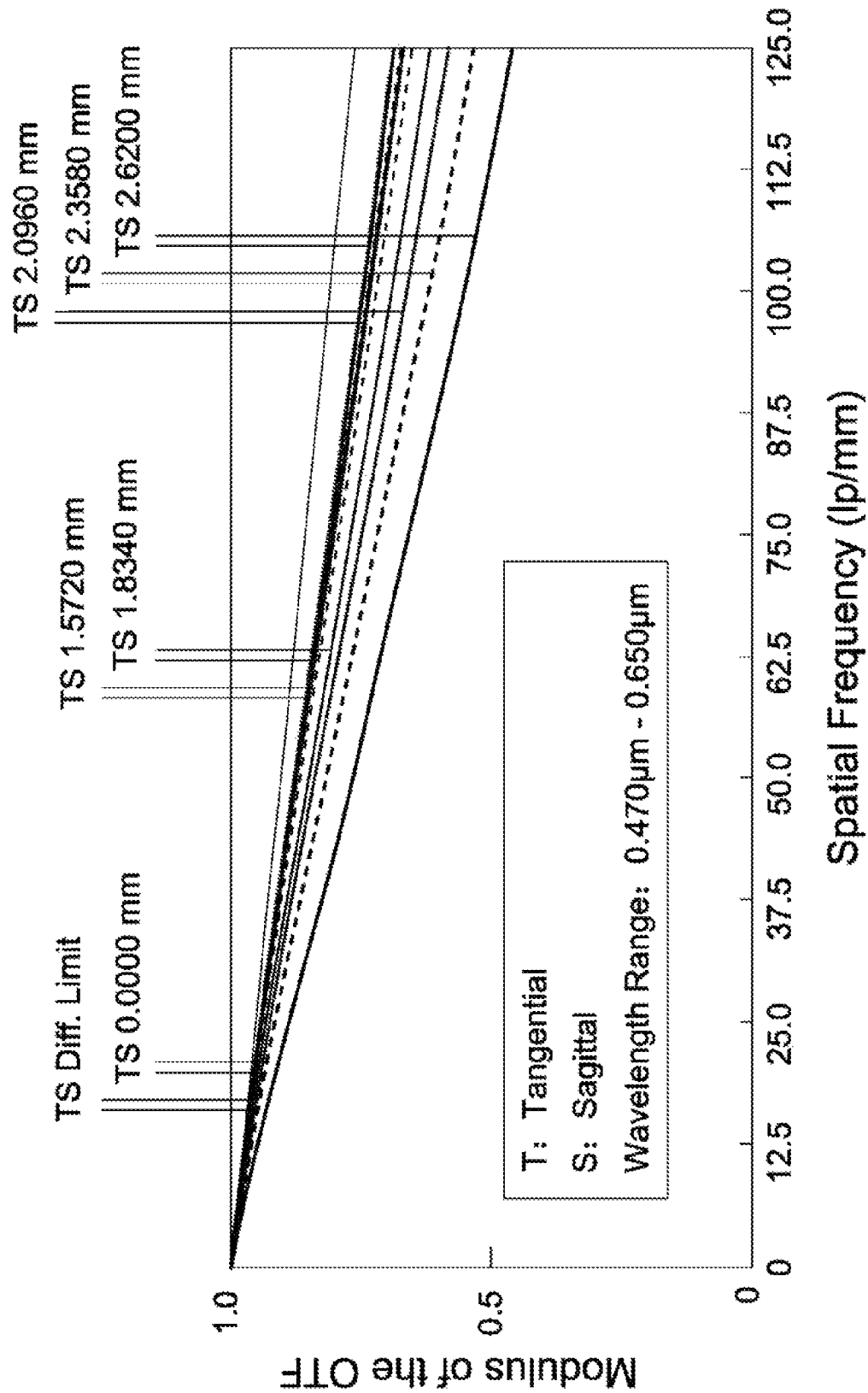
Figure 3:
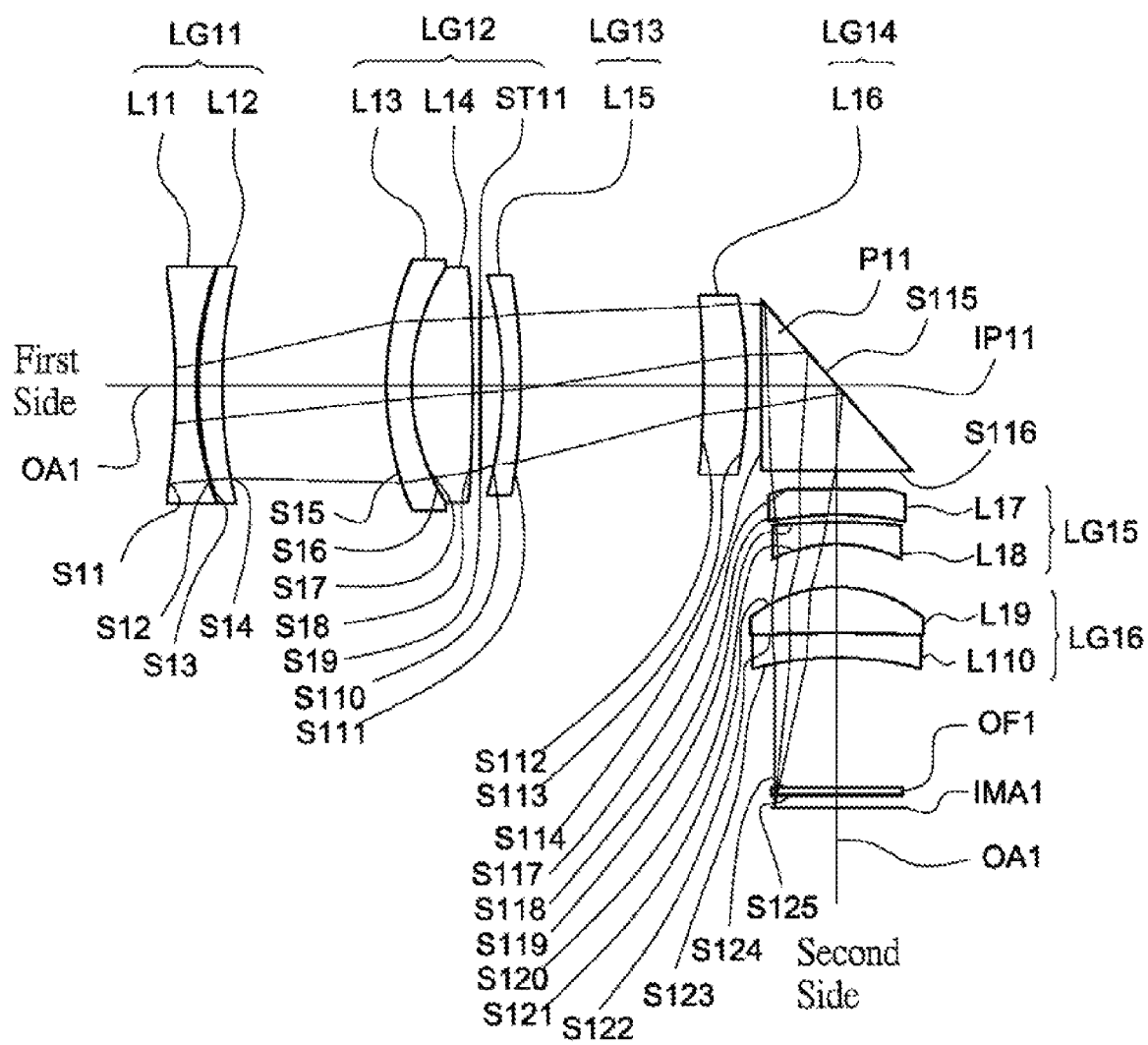
FIG. 3 is a lens layout and optical path diagram of the lens assembly at 5.5 times magnification in accordance with the first embodiment of the invention.
Figure 4:
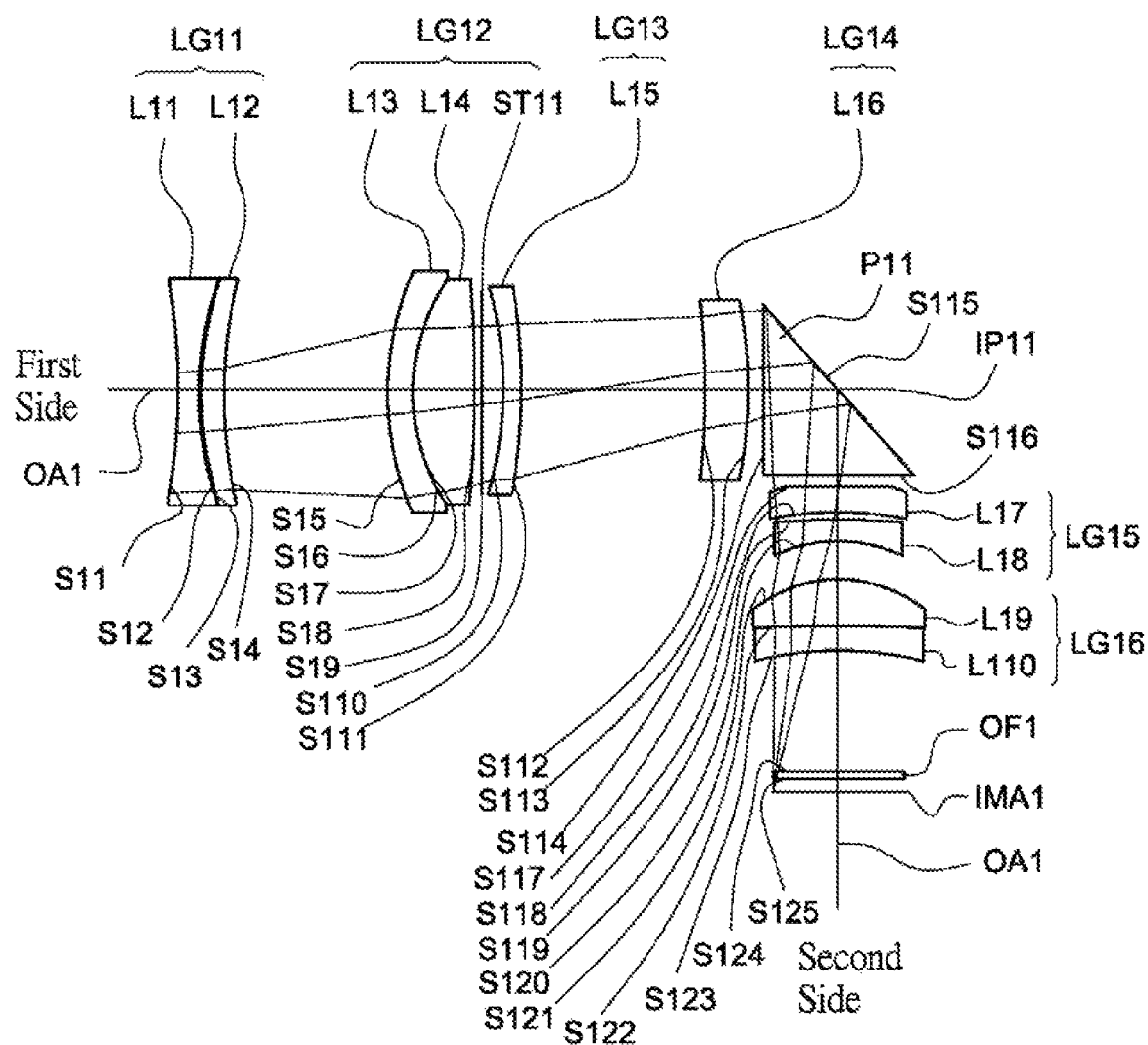
FIG. 4 is a lens layout and optical path diagram of the lens assembly at 5.5 times magnification and large aperture mode in accordance with the first embodiment of the invention.
Figure 5:
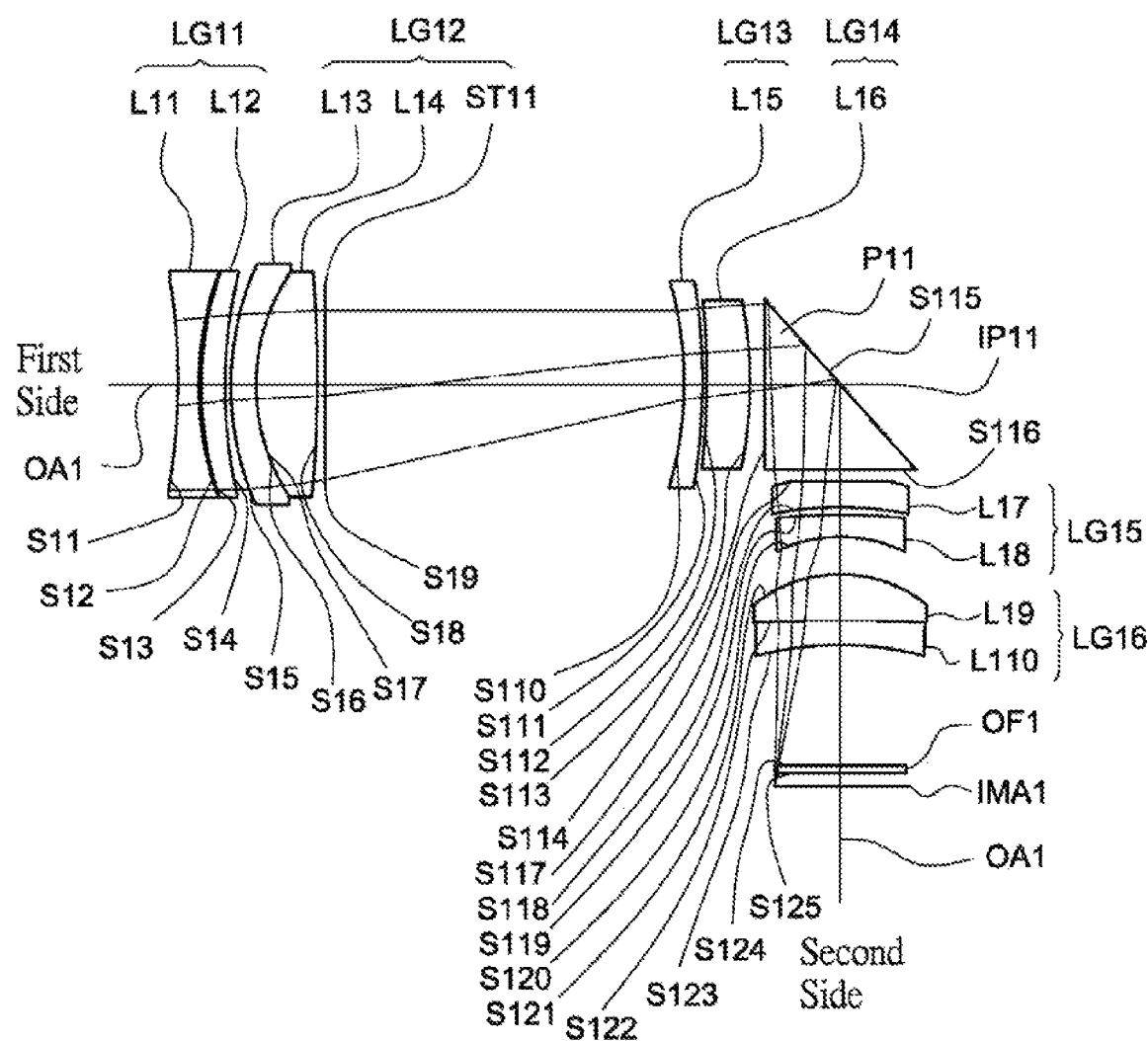
FIG. 5 is a lens layout and optical path diagram of the lens assembly at 10 times magnification in accordance with the first embodiment of the invention.
Figure 6A:
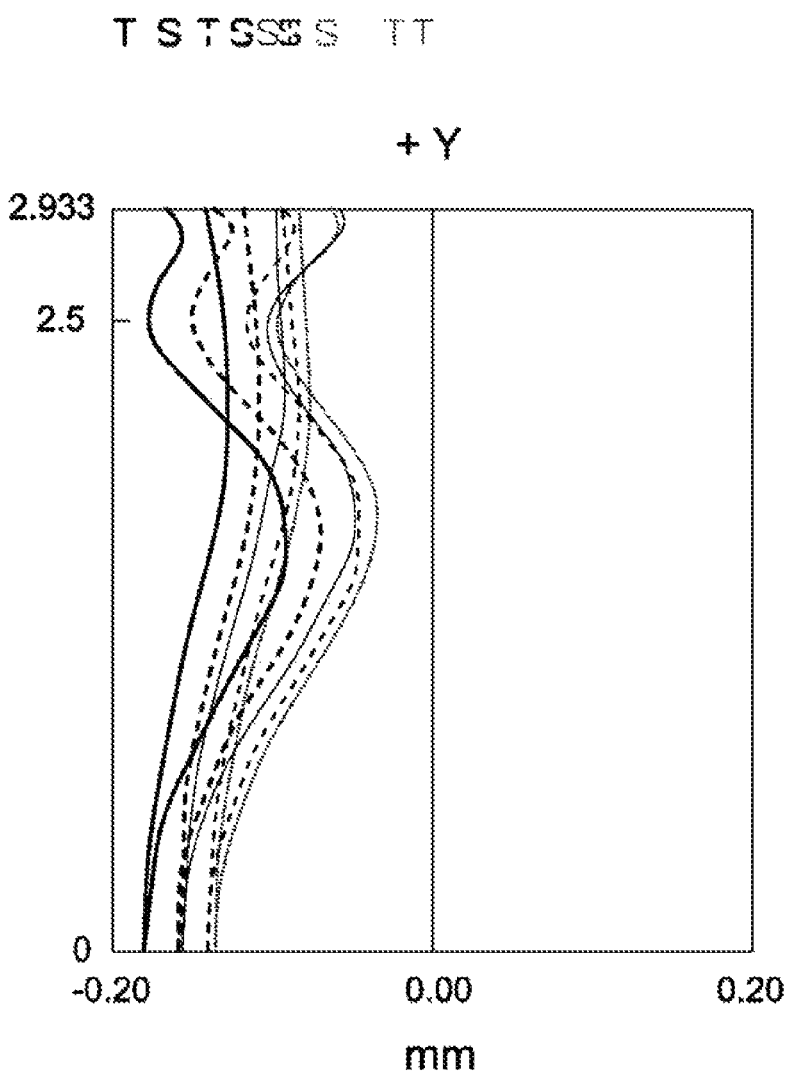
FIG. 6A, FIG. 6B, and FIG. 6C depict a field curvature diagram, a distortion diagram, and a modulation transfer function diagram of the lens assembly at 10 times magnification in accordance with the first embodiment of the invention, respectively.
Figure 6B:
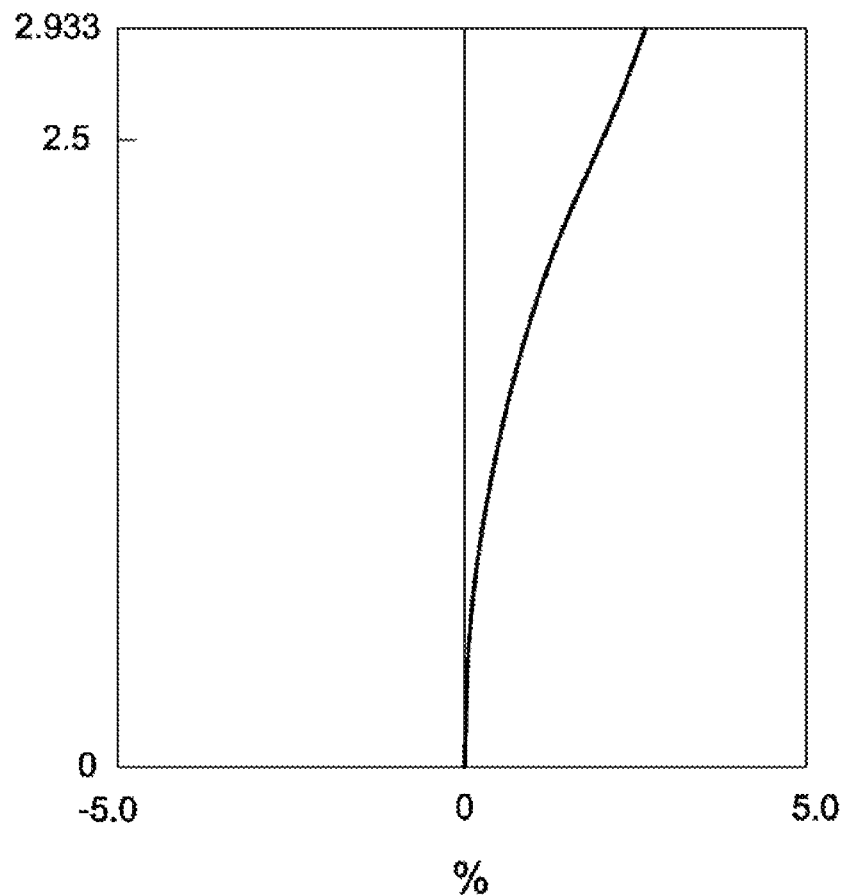
Figure 6C:
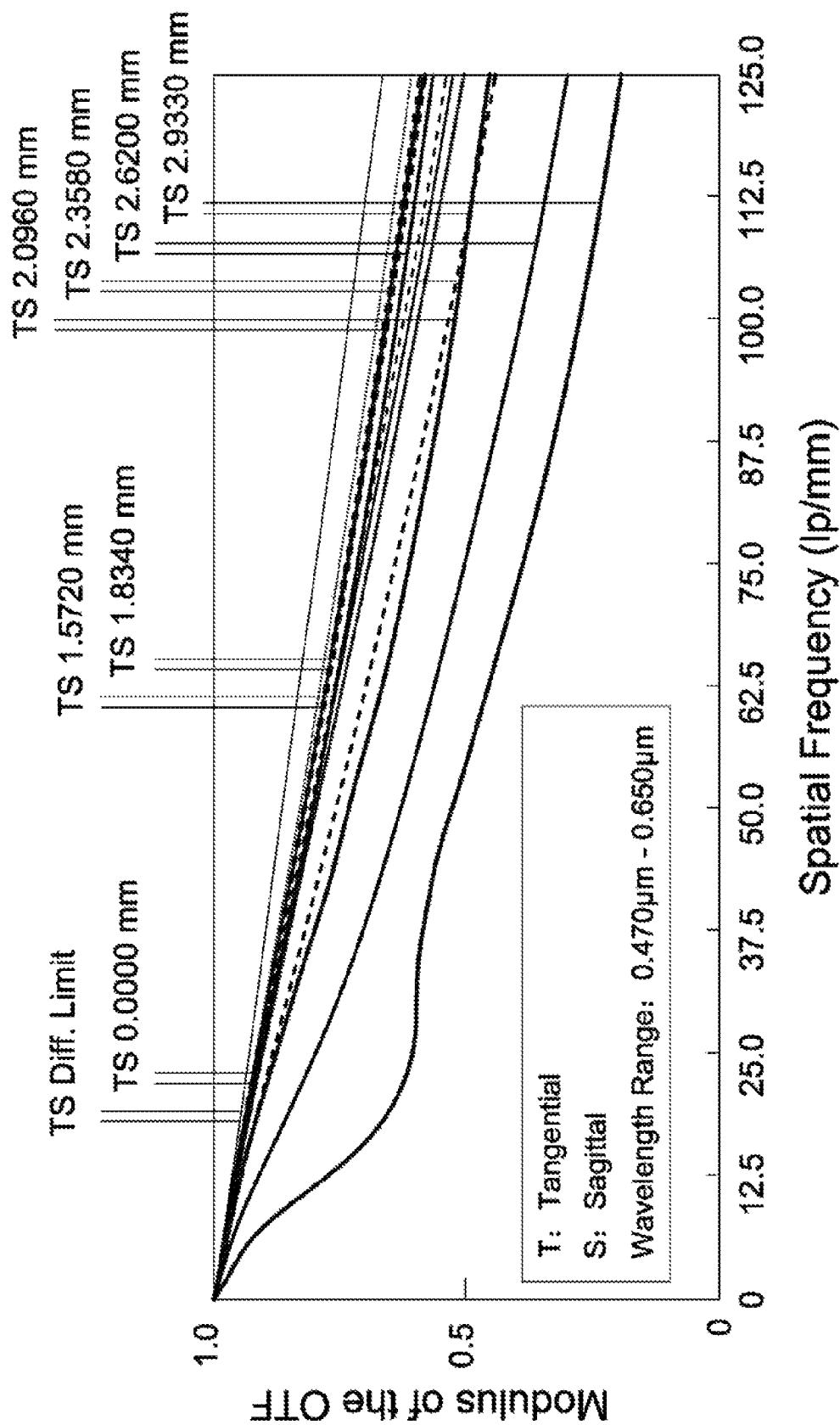

Referring to FIG. 1, FIG. 3, FIG. 4, and FIG. 5, wherein FIG. 1 is a lens layout and optical path diagram of a lens assembly at 3 times magnification in accordance with a first embodiment of the invention, FIG. 3 is a lens layout and optical path diagram of the lens assembly at 5.5 times magnification in accordance with the first embodiment of the invention, FIG. 4 is a lens layout and optical path diagram of the lens assembly at 5.5 times magnification and large aperture mode in accordance with the first embodiment of the invention, and FIG. 5 is a lens layout and optical path diagram of the lens assembly at 10 times magnification in accordance with the first embodiment of the invention. Lens assembly 1 includes a first lens group LG11, a second lens group LG12, a third lens group LG13, a fourth lens group LG14, a first reflective element P11, a fifth lens group LG15, a sixth lens group LG16, and an optical filter OF1. The first lens group LG11 is with negative refractive power. The second lens group LG12 is with positive refractive power. The third lens group LG13 is with negative refractive power. The fourth lens group LG14 is with positive refractive power. The fifth lens group LG15 is with negative refractive power. The sixth lens group LG16 is with positive refractive power. The first reflective element P11 includes a first incident surface S114, a first reflective surface S115, and a first exit surface S116.

The first lens group LG11, the second lens group LG12, the third lens group LG13, the fourth lens group LG14, the first reflective element P11, the fifth lens group LG15, and the sixth lens group LG16 are arranged in order from a first side to a second side along an axis OA1. The path of the light from the first side to the first turning point IP11 and then to an image plane IMA1 is called axis OA1. The path of the axis OA1 will turn once after passing through the reflective element. The axis OA1 can also be designed to have multiple turns, not limited to only one turn and falls into the scope of the invention. The reflective element can be a prism or a mirror.

The second lens group LG12 and the third lens group LG13 can move along the axis OA1 to toward the first side or away from the first side and thereby change the magnification of the lens assembly.

The fifth lens group LG15 can move along the axis OA1 to toward the second side or away from the second side and thereby perform auto focus.

The sixth lens group can move along the direction perpendicular to the axis OA1 to toward the first side or away from the first side and thereby perform optical image stabilization.

In operation, the light from the first side incident on the first lens group LG11 first, then sequentially passes through the second lens group LG12, the third lens group LG13, and the fourth lens group LG14, then reflected by the first reflective element P11 to change propagation direction, then sequentially passes through the fifth lens group LG15 and the sixth lens group LG16, and finally imaged on the image plane IMA1.

A detailed description of a lens assembly in accordance with a first embodiment of the invention is as follows. Referring to FIG. 1, FIG. 3, FIG. 4, and FIG. 5. The lens assembly 1 includes a first lens group LG11, a second lens group LG12, a third lens group LG13, a fourth lens group LG14, a first reflective element P11, a fifth lens group LG15, a sixth lens group LG16, and an optical filter OF1.

The first lens group LG11 is with negative refractive power and includes a 1-1 lens L11 and a 1-2 lens L12, both of which are arranged in order from the first side to the second side along the axis OA1. The 1-1 lens L11 is a biconcave lens with negative refractive power and includes a concave surface S11 facing the first side along the axis OA' and another concave surface S12 facing the second side along the axis OA', and both of the concave surface S11 and concave surface S12 are aspheric surfaces. The 1-2 lens L12 is a meniscus lens with positive refractive power and includes a convex surface S13 facing the first side along the axis OA' and a concave surface S14 facing the second side along the axis OA1, and both of the convex surface S13 and concave surface S14 are aspheric surfaces.

The second lens group LG12 is with positive refractive power and includes a 2-1 lens L13, a 2-2 lens L14, and a variable stop ST11, all of which are arranged in order from the first side to the second side along the axis OA1. The 2-1 lens L13 is a meniscus lens with negative refractive power and includes a convex surface S15 facing the first side along the axis OA' and a concave surface S16 facing the second side along the axis OA1, and both of the convex surface S15 and concave surface S16 are aspheric surfaces. The 2-2 lens L14 is a biconvex lens with positive refractive power and includes a convex surface S17 facing the first side along the axis OA' and another convex surface S18 facing the second side along the axis OA1, and both of the convex surface S17 and convex surface S18 are aspheric surfaces. The variable stop ST11 can change its hole diameter to achieve multi-stage changes of the hole diameter by the built-in driving element (not shown) driving the mechanism.

The third lens group LG13 is with negative refractive power and includes a 3-1 lens L15. The 3-1 lens L15 is a meniscus lens with negative refractive power and includes a concave surface S110 facing the first side along the axis OA' and a convex surface S111 facing the second side along the axis OA1, and both of the concave surface S110 and convex surface S111 are aspheric surfaces.

The fourth lens group LG14 is with positive refractive power and includes a 4-1 lens L16. The 4-1 lens L16 is a meniscus lens with positive refractive power and includes a concave surface S112 facing the first side along the axis OA1 and a convex surface S113 facing the second side along the axis OA1, and both of the concave surface S112 and convex surface S113 are aspheric surfaces.

The first reflective element P11 is a prism and includes a first incident surface S114, a first reflective surface S115, and a first exit surface S116. The first incident surface S114 faces the first side along the axis OA1. The first reflective surface S115 faces the second side along the axis OA1. The first exit surface S116 faces the second side along the axis OA1. The first incident surface S114 and the first exit surface S116 are perpendicular to each other. The first reflective element P11 can also be a reflective mirror. The first reflective element P11 can also only include one reflective surface when the first reflective element P11 is a reflective mirror.

The fifth lens group LG15 is with negative refractive power and includes a 5-1 lens L17 and a 5-2 lens L18, both of which are arranged in order from the first side to the second side along the axis OA1. The 5-1 lens L17 is a meniscus lens with negative refractive power and includes a convex surface S117 facing the first side along the axis OA1 and a concave surface S118 facing the second side along the axis OA1, and both of the convex surface S117 and concave surface S118 are aspheric surfaces. The 5-2 lens L18 is a meniscus lens with negative refractive power and includes a convex surface S119 facing the first side along the axis OA1 and a concave surface S120 facing the second side along the axis OA1, and both of the convex surface S119 and concave surface S120 are aspheric surfaces.

The sixth lens group LG16 is with positive refractive power and includes a 6-1 lens L19 and a 6-2 lens L110, both of which are arranged in order from the first side to the second side along the axis OA1. The 6-1 lens L19 is a meniscus lens with positive refractive power and includes a convex surface S121 facing the first side along the axis OA1 and a concave surface S122 facing the second side along the axis OA1, and the convex surface S121 is an aspheric surface and the concave surface S122 is a spherical surface. The 6-2 lens L110 is a meniscus lens with negative refractive power and includes a convex surface S122 facing the first side along the axis OA1 and a concave surface S123 facing the second side along the axis OA1, and the convex surface S122 is a spherical surface and the concave surface S123 is an aspheric surface.

Both of the object side surface S124 and image side surface S125 of the optical filter OF1 are plane surfaces.

In the above description, "toward the first side along the axis" means that faces the first side along the axis as the lens is located in front of the reflective element and "toward the second side along the axis" means that faces the direction opposite to the first side along the axis as the lens is in front of the reflective element, and "toward the first side along the axis" means that faces the direction opposite to the second side along the axis as the lens is located behind of the reflective element and "toward the second side along the axis" means that faces the second side along the axis as the lens is located behind of the reflective element. The same goes for the following. The reflective element may be the first reflective element described above, or a combination of the first reflective element and other reflective elements.

When the lens assembly 1 changes magnification from 3 times (as shown in FIG. 1) to 5.5 times (as shown in FIG. 3 and FIG. 4), the first lens group LG11 is fixed, the second lens group LG12 moves to the first side along the axis OA1, the third lens group LG13 moves to the first side along the axis OA1, the fourth lens group LG14 is fixed, and the sixth lens group LG16 is fixed, so that the interval from the first lens group LG11 to the second lens group LG12 is decreased, the interval from the second lens group LG12 to third lens group LG13 is increased, the interval from the third lens group LG13 to the fourth lens group LG14 is increased, and the interval from the fourth lens group LG14 to the first incident surface S114 of the first reflective element P11 is fixed. When the lens assembly 1 changes magnification from 5.5 times (as shown in FIG. 3 and FIG. 4) to 10 times (as shown in FIG. 5), the first lens group LG11 is fixed, the second lens group LG12 moves to the first side along the axis OA1, the third lens group LG13 moves to the second side along the axis OA1, the fourth lens group LG14 is fixed, and the sixth lens group LG16 is fixed, so that the interval from the first lens group LG11 to the second lens group LG12 is decreased, the interval from the second lens group LG12 to the third lens group LG13 is increased, the interval from the third lens group LG13 to the fourth lens group LG14 is decreased, and the interval from the fourth lens group LG14 to the first incident surface S114 of the first reflective element P11 is fixed. The above-mentioned intervals change as the lens assembly 1 changes magnification from 3 times to 10 times can be clearly seen in FIGS. 1, 3, 4, and 5.

The fifth lens group LG15 can move slightly closer to or away from the second side along the axis OA1 thereby perform auto focus.

The sixth lens group LG16 can move along the direction perpendicular to the axis OA1 to toward the first side or away from the first side according to the operating condition of the user and thereby perform optical image stabilization.

The magnifications of the lens assembly 1 in FIG. 3 and FIG. 4 are 5.5 times, wherein the lens assembly 1 in FIG. 4 is operating in the large aperture mode, so that the variable stop diameter (7.845 mm) of the lens assembly 1 in FIG. 4 will be significantly larger than that of the lens assembly 1 in FIG. 3 (6.114 mm).

In addition, the lens assembly 1 satisfies at least one of the following conditions:

$-12\ mm < A-B < 16\ mm$ (1)

$0.2 < AB < 10$ (2)

$0.5 < C/A < 3$ (3)

$10\ mm < A + L1D < 26\ mm$ (4)

$12\ mm < L1D + StopD < 16\ mm$ (5)

$0.8 < f/L1D < 4.2$ (6)

$2 < TTL/A < 11$ (7)

$0.1\ mm < D < 0.6\ mm$ (8)

$11\ mm < C < 12\ mm$ (9)

wherein A is an interval from a second side surface S14 of the lens L12 closest to the second side in the first lens group LG11 to the surface S19 of the variable stop along the axis OA1 for the first embodiment, B is an interval from the surface S19 of the variable stop to a first side surface S112 of the lens L16 closest to the first side in the fourth lens group LG14 along the axis OA1 for the first embodiment, C is an interval from a first side surface S117 of the lens L17 closest to the first side in the fifth lens group LG15 to an image plane IMA1 along the axis OA1 for the first embodiment, L1D is an effective optical diameter of the lens L11 closest to the first side in the first lens group LG11 for the first embodiment, StopD is a diameter of the variable stop ST11 for the first embodiment, f is an effective focal length of the lens assembly 1 for the first embodiment, TTL is an interval from a first side surface S11 of the lens L11 closest to the first side in the first lens group LG11 to the image plane IMA1 along the axis OA1 for the first embodiment, and D is an offset of the sixth lens group LG16 moving along the direction perpendicular to the axis OA1 for the first embodiment.

With the above design of the lenses, variable stop ST11, first reflective element P11, and at least one of the conditions (1)-(9) satisfied, the lens assembly 1 can have an effective decreased total lens length, an effective decreased lens assembly thickness, an effective increased resolution, an effective corrected aberration, and true optical zoom function and optical image stabilization can be realized.

Table 1 shows the optical specification of the lens assembly 1 in FIG. 1, FIG. 3, FIG. 4, and FIG. 5 when the lens assembly 1 is at 3 times magnification, 5.5 times magnification, 5.5 times magnification and large aperture mode, and 10 times magnification, respectively.

TABLE 1

| Magnification | 3 | 5.5 | 5.5 and Large Aperture Mode | 10 |
|---|---|---|---|---|
| Effective Focal Length(mm) | 9.59 | 16.06 | 16.06 | 29.30 |
| F-number | 2.66 | 3.51 | 2.72 | 3.75 |
| Total Lens length (mm) | 41.919 | 41.914 | 41.914 | 41.921 |
| Fields of View (degrees) | 30.56 | 18.56 | 18.56 | 10.22 |
| Variable Stop Diameter (mm) | 6.185 | 6.114 | 7.845 | 7.824 |

| Surface Number | Radius of Curvature (mm) | Thickness (mm) | Nd | Vd | Effective Focal Length (mm) | Remark |
|---|---|---|---|---|---|---|
| S11 | −19.8518 | 0.799 | 1.525 | 70.4 | −13.14 | L11 |
| S12 | 10.75632 | 0.114177 | | | | |
| S13 | 9.768414 | 0.98784 | 2.00178 | 19.32 | 46.04 | L12 |
| S14 | 11.73462 | 13.96045(3X) 6.690061(5.5X) 6.690061(5.5X, Large Aperture Mode) 0.197612(10X) | | | | |
| S15 | 10.40495 | 0.994 | 2.00178 | 19.32 | −22.57 | L13 |
| S16 | 6.803284 | 0.02932 | | | | |
| S17 | 6.975987 | 2.497025 | 1.72903 | 54.04 | 7.49 | L14 |
| S18 | −21.6041 | 0.25 | | | | |
| S19 | ∞ | 0.961047(3X) 0.988935(5.5X) 0.988935(5.5X, Large Aperture Mode) 14.72545(10X) | | | | ST11 |

TABLE 1-continued

| | | | | | | |
|---|---|---|---|---|---|---|
| S110 | −8.59899 | 0.797166 | 1.7725 | 49.49 | −69.87 | L15 |
| S111 | −10.6352 | 0.09(3X) | | | | |
| | | 7.32858(5.5X) | | | | |
| | | 7.32858(5.5X, Large Aperture Mode) | | | | |
| | | 0.09(10X) | | | | |
| S112 | −120.249 | 1.72463 | 1.7225 | 29.23 | 29.09 | L16 |
| S113 | −18.095 | 0.595418 | | | | |
| S114 | ∞ | 3.1 | 2.003307 | 28.31737 | | P11 The First Incident Surface |
| S115 | ∞ | 3.1 | 2.003307 | 28.31737 | | P11 The First Reflective Surface |
| S116 | ∞ | 0.56297(3X) | | | | P11 The First Exit Surface |
| | | 0.56307(5.5X) | | | | |
| | | 0.56297(5.5X, Large Aperture Mode) | | | | |
| | | 0.58384(10X) | | | | |
| S117 | 154.197 | 0.92704 | 1.790658 | 44.97415 | −47.11 | L17 |
| S118 | 30.0201 | 0.24381 | | | | |
| S119 | 32.0819 | 0.83464 | 1.790658 | 44.97415 | −16.75 | L18 |
| S120 | 9.29218 | 1.55647(3X) | | | | |
| | | 1.55492(5.5X) | | | | |
| | | 1.55492(5.5X, Large Aperture Mode) | | | | |
| | | 1.53579(10X) | | | | |
| S121 | 6.96908 | 1.61 | 1.790658 | 44.97415 | 9.80 | L19 |
| S122 | 60.255 | 0.8 | 2.00178 | 19.32 | −18.68 | L110 |
| S123 | 14.2821 | 4.67421 | | | | |
| S124 | ∞ | 0.21 | 1.5168 | 64.16734 | | OF1 |
| S125 | ∞ | 0.5 | | | | |

The aspheric surface sag z of each aspheric lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} \pm Fh^{14} \pm Gh^{16} \quad 35$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each aspheric lens are shown in Table 2.

TABLE 2

| Surface Number | k | A | B | C | D | E | F | G |
|---|---|---|---|---|---|---|---|---|
| S11 | −3.27 | 5.66E−06 | 8.01E−06 | 3.87E−07 | −6.13E−08 | −2.43E−10 | 1.14E−10 | −3.20E−12 |
| S12 | 1.27 | 1.03E−04 | −2.22E−06 | −5.58E−07 | −7.74E−09 | −7.14E−10 | −4.50E−11 | 7.20E−13 |
| S13 | −0.70 | −1.32E−04 | −1.98E−05 | −2.13E−07 | −1.54E−08 | −1.17E−10 | 3.85E−11 | 1.77E−12 |
| S14 | −2.22 | −2.58E−04 | −6.15E−06 | −1.05E−06 | 2.04E−08 | 5.17E−10 | −1.136E−11 | 3.07E−12 |
| S15 | 0.16 | 9.36E−06 | 1.95E−06 | 3.02E−08 | −6.82E−10 | −1.03E−10 | −2.18E−12 | −7.78E−14 |
| S16 | −2.47E−02 | −1.48E−05 | −7.61E−07 | −9.10E−08 | −3.18E−09 | −7.28E−12 | −6.55E−12 | −1.22E−12 |
| S17 | −1.36E−02 | −7.51E−06 | 8.06E−07 | 4.79E−08 | −7.29E−10 | −2.28E−10 | −1.40E−11 | 2.15E−13 |
| S18 | −11.23 | 1.00E−04 | 2.92E−06 | 2.84E−07 | 1.15E−08 | −9.80E−11 | −2.37E−11 | 1.74E−12 |
| S110 | −6.16 | 2.49E−04 | −8.04E−06 | 1.10E−06 | −1.09E−08 | 4.91E−12 | 2.08E−10 | −6.02E−12 |
| S111 | −10.19 | 1.50E−04 | 9.12E−06 | −3.93E−07 | 4.88E−08 | 1.04E−09 | −1.22E−10 | 6.59E−12 |
| S112 | 62.88 | −1.23E−03 | −8.15E−05 | 5.11E−06 | −1.00E−07 | −4.81E−08 | 4.74E−09 | −7.58E−11 |
| S113 | 10.37 | −1.25E−03 | −1.85E−05 | −1.36E−06 | 2.93E−07 | 1.40E−09 | −1.92E−09 | 1.12E−10 |
| S117 | 81.27 | −5.68E−04 | 7.63E−05 | −1.69E−05 | −1.04E−06 | −7.50E−08 | −8.38E−09 | 6.45E−10 |
| S118 | 24.04 | 4.23E−04 | 7.89E−07 | −1.10E−05 | −1.40E−06 | −5.18E−08 | 1.98E−11 | −2.87E−09 |
| S119 | 95.66 | −1.14E−03 | −3.05E−05 | 1.30E−05 | 1.49E−06 | 3.45E−08 | −6.82E−09 | 3.64E−09 |
| S120 | 5.62 | −2.62E−03 | 6.07E−06 | 3.02E−06 | −3.40E−07 | 3.73E−07 | 1.09E−07 | −1.42E−08 |
| S121 | −1.09 | −6.54E−04 | −2.17E−06 | −6.67E−07 | 1.95E−07 | 4.13E−09 | −2.48E−09 | 1.25E−10 |
| S123 | −13.05 | −9.44E−04 | 5.56E−05 | −1.09E−05 | 1.79E−06 | −9.19E−08 | −3.39E−09 | 3.53E−10 |

Table 3 shows the parameters and condition values for conditions (1)-(9) in accordance with the first embodiment of the invention. It can be seen from Table 3 that the lens assembly 1 of the first embodiment satisfies the conditions (1)-(9).

TABLE 3

|  | A(mm) | B(mm) | C(mm) | L1D(mm) | StopD(mm) |
| --- | --- | --- | --- | --- | --- |
| 3X | 17.731 | 1.848 | 11.356 | 7.82 | 6.185 |
| 5.5X | 10.460 | 9.115 | 11.355 | 7.82 | 6.114 |
| 5.5X, Large Aperture Mode | 10.460 | 9.115 | 11.355 | 7.82 | 7.845 |
| 10X | 3.968 | 15.613 | 11.336 | 7.82 | 7.824 |

|  | D(mm) |
| --- | --- |
| 3X | 0.2 |
| 5.5X | 0.3 |
| 5.5X, Large Aperture Mode | 0.3 |
| 10X | 0.55 |

|  | A-B | A/B | C/A | A + L1D | L1D + StopD |
| --- | --- | --- | --- | --- | --- |
| 3X | 15.883 mm | 9.593 | 0.640 | 25.551 mm | 14.005 mm |
| 5.5X | 1.346 mm | 1.148 | 1.085 | 18.280 mm | 13.934 mm |
| 5.5X, Large Aperture Mode | 1.346 mm | 1.148 | 1.085 | 18.280 mm | 15.664 mm |
| 10X | −11.645 mm | 0.254 | 2.857 | 11.788 mm | 15.644 mm |

|  | f/L1D | TTL/A |
| --- | --- | --- |
| 3X | 1.226 | 2.364 |
| 5.5X | 2.054 | 4.007 |
| 5.5X, Large Aperture Mode | 2.054 | 4.007 |
| 10X | 3.747 | 10.565 |

In addition, the lens assembly 1 of the first embodiment can meet the requirements of optical performance as seen in FIGS. 2A-2C and 6A-6C. It can be seen from FIG. 2A that the field curvature of tangential direction and sagittal direction in the lens assembly 1 at 3 times magnification of the first embodiment ranges from −0.06 mm to −0.02 mm. It can be seen from FIG. 2B that the distortion in the lens assembly 1 at 3 times magnification of the first embodiment ranges from −3% to 0%. It can be seen from FIG. 2C that the modulation transfer function of tangential direction and sagittal direction in the lens assembly 1 at 3 times magnification of the first embodiment ranges from 0.46 to 1.0. It can be seen from FIG. 6A that the field curvature of tangential direction and sagittal direction in the lens assembly 1 at 10 times magnification of the first embodiment ranges from −0.2 mm to 0 mm. It can be seen from FIG. 6B that the distortion in the lens assembly 1 at 10 times magnification of the first embodiment ranges from 0% to 3%. It can be seen from FIG. 6C that the modulation transfer function of tangential direction and sagittal direction in the lens assembly 1 at 10 times magnification of the first embodiment ranges from 0.19 to 1.0. It is obvious that the field curvature and the distortion of the lens assembly 1 of the first embodiment can be corrected effectively, the image resolution can meet the requirements. Therefore, the lens assembly 1 of the first embodiment is capable of good optical performance.

The lens assembly of the invention can also add a second reflective element disposed between the first side and the first lens group. The second reflective element can be a prism or a mirror, the light from the first side can sequentially pass through the second reflective element, the first lens group, the second lens group, the third lens group, the fourth lens group, the first reflective element, the fifth lens group and the sixth lens group to the image plane, and falls into the scope of the invention.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
   a first lens group which is with negative refractive power;
   a second lens group which is with positive refractive power;
   a third lens group which is with negative refractive power;
   a fourth lens group which is with positive refractive power;
   a fifth lens group which is with refractive power;
   a sixth lens group which is with refractive power; and
   a first reflective element which comprises a first reflective surface;
   wherein the first lens group, the second lens group, the third lens group, the fourth lens group, the fifth lens group, and the sixth lens group are arranged in order from a first side to a second side along an axis;
   wherein a light from the first side sequentially passes through the first lens group, the second lens group, the third lens group, the fourth lens group, the fifth lens group, and the sixth lens group to the second side;
   wherein the first reflective element is disposed between the first lens group and the sixth lens group;
   wherein the second lens group and the third lens group can move along the axis to change a magnification of the lens assembly.

2. The lens assembly as claimed in claim 1, wherein the first reflective element further comprises a first incident surface facing the first side along the axis and a first exit surface facing the second side along the axis.

3. The lens assembly as claimed in claim 1, wherein:
   the fifth lens group is with negative refractive power; and
   the sixth lens group is with positive refractive power.

4. The lens assembly as claimed in claim 3, wherein:
   the first lens group comprises a 1-1 lens which is the first lens in the first lens group in order from the first side and which is with negative refractive power;
   the second lens group comprises a 2-2 lens which is the second lens in the second lens group in order from the first side and which is with positive refractive power; and
   the third lens group comprises a 3-1 lens which is the first lens in the third lens group in order from the first side and which is with negative refractive power.

5. The lens assembly as claimed in claim 4, wherein:
   the fourth lens group comprises a 4-1 lens which is the first lens in the fourth lens group in order from the first side and which is with positive refractive power;
   the fifth lens group comprises a 5-1 lens which is the first lens in the fifth lens group in order from the first side and which is with negative refractive power; and the sixth lens group comprises a 6-1 lens which is the first lens in the sixth lens group in order from the first side and which is with positive refractive power.

6. The lens assembly as claimed in claim 5, wherein:
the 1-1 lens which is a biconcave lens and comprises a concave surface facing the first side along the axis and another concave surface facing the second side along the axis;
the 2-2 lens which is a biconvex lens and comprises a convex surface facing the first side along the axis and another convex surface facing the second side along the axis; and
the 3-1 lens which is a meniscus lens and comprises a concave surface facing the first side along the axis and a convex surface facing the second side along the axis.

7. The lens assembly as claimed in claim 6, wherein:
the 4-1 lens which is a meniscus lens and comprises a concave surface facing the first side along the axis and a convex surface facing the second side along the axis;
the 5-1 lens which is a meniscus lens and comprises a convex surface facing the first side along the axis and a concave surface facing the second side along the axis; and
the 6-1 lens comprises a convex surface facing the first side along the axis.

8. The lens assembly as claimed in claim 5, wherein:
the fifth lens group further comprises a 5-2 lens disposed between the 5-1 lens and the sixth lens group, wherein the 5-2 lens is the second lens in the fifth lens group in order from the first side and is with negative refractive power; and
the sixth lens group further comprises a 6-2 lens disposed between the 6-1 lens and the second side, wherein the 6-2 lens is the second lens in the sixth lens group in order from the first side and is with negative refractive power.

9. The lens assembly as claimed in claim 8, wherein:
the 5-2 lens which is a meniscus lens and comprises a convex surface facing the first side along the axis and a concave surface facing the second side along the axis; and
the 6-2 lens comprises a concave surface facing the second side along the axis.

10. The lens assembly as claimed in claim 9, wherein the 6-1 lens and the 6-2 lens are cemented.

11. The lens assembly as claimed in claim 4, wherein:
the first lens group further comprises a 1-2 lens disposed between the 1-1 lens and the second lens group, wherein the 1-2 lens is the second lens in the first lens group in order from the first side and is with positive refractive power; and
the second lens group further comprises a 2-1 lens disposed between the first lens group and the 2-2 lens, wherein the 2-1 lens is the first lens in the second lens group in order from the first side and is with negative refractive power.

12. The lens assembly as claimed in claim 11, wherein:
the 1-2 lens which is a meniscus lens and comprises a convex surface facing the first side along the axis and a concave surface facing the second side along the axis; and
the 2-1 lens which is a meniscus lens and comprises a convex surface facing the first side along the axis and a concave surface facing the second side along the axis.

13. The lens assembly as claimed in claim 1, wherein the second lens group comprises a variable stop.

14. The lens assembly as claimed in claim 1, wherein the fifth lens group can move along the axis and thereby perform auto focus.

15. The lens assembly as claimed in claim 1, wherein the sixth lens group can move along the direction perpendicular to the axis to achieve optical image stabilization.

16. The lens assembly as claimed in claim 1, wherein:
the second lens group comprises a variable stop; and
the lens assembly satisfies at least one of following conditions:

$$-12 \text{ mm} < A - B < 16 \text{ mm};$$

$$0.2 < AB < 10;$$

$$0.5 < C/A < 3;$$

$$2 < TTL/A < 11$$

wherein A is an interval from a second side surface of the lens closest to the second side in the first lens group to the variable stop along the axis, B is an interval from the variable stop to a first side surface of the lens closest to the first side in the fourth lens group along the axis, C is an interval from a first side surface of the lens closest to the first side in the fifth lens group to an image plane along the axis, and TTL is an interval from a first side surface of the lens closest to the first side along the axis in the first lens group to an image plane along the axis.

17. The lens assembly as claimed in claim 1, wherein:
the second lens group comprises a variable stop; and
the lens assembly satisfies at least one of following conditions:

$$10 \text{ mm} < A + L1D < 26 \text{ mm};$$

$$12 \text{ mm} < L1D + StopD < 16 \text{ mm};$$

$$0.8 < f/L1D < 4.2;$$

wherein A is an interval from a second side surface of the lens closest to the second side in the first lens group to the variable stop along the axis, L1D is an effective optical diameter of the lens closest to the first side in the first lens group along the axis, StopD is a diameter of the variable stop, and f is an effective focal length of the lens assembly.

18. A lens assembly comprising:
a first lens group which is with negative refractive power;
a second lens group which is with positive refractive power;
a third lens group which is with negative refractive power;
a fourth lens group which is with positive refractive power;
a fifth lens group which is with refractive power;
a sixth lens group which is with refractive power;
a first reflective element which comprises a first reflective surface; and
a second reflective element which comprises a second reflective surface;
wherein the first lens group, the second lens group, the third lens group, the fourth lens group, the fifth lens group, and the sixth lens group are arranged in order from a first side to a second side along an axis;
wherein a light from the first side sequentially passes through the first lens group, the second lens group, the third lens group, the fourth lens group, the fifth lens group, and the sixth lens group to the second side;

wherein the first reflective element is disposed between the first lens group and the sixth lens group;

wherein the second reflective element is disposed between the first side and the first lens group.

19. A lens assembly comprising:
a first lens group which is with negative refractive power;
a second lens group which is with positive refractive power;
a third lens group which is with negative refractive power;
a fourth lens group which is with positive refractive power;
a fifth lens group which is with refractive power;
a sixth lens group which is with refractive power; and
a first reflective element which comprises a first reflective surface;
wherein the first lens group, the second lens group, the third lens group, the fourth lens group, the fifth lens group, and the sixth lens group are arranged in order from a first side to a second side along an axis;
wherein a light from the first side sequentially passes through the first lens group, the second lens group, the third lens group, the fourth lens group, the fifth lens group, and the sixth lens group to the second side;
wherein the first reflective element is disposed between the first lens group and the sixth lens group; The lens assembly as claimed in claim 1, wherein the lens assembly satisfies at least one of following conditions:

$$11\ mm<C<12\ mm;$$

$$0.1\ mm<D<0.6\ mm;$$

wherein C is an interval from a first side surface of the lens closest to the first side in the fifth lens group to an image plane along the axis and D is an offset of the sixth lens group moving along the direction perpendicular to the axis.

20. The lens assembly as claimed in claim 19, wherein the second lens group and the third lens group can move along the axis to change a magnification of the lens assembly.

* * * * *